US006135746A

United States Patent [19]

Wood et al.

[11] Patent Number: 6,135,746

[45] Date of Patent: Oct. 24, 2000

[54] APPARATUS FOR PRILLING AN OXIDIZING SALT OF AMMONIA

[75] Inventors: Stanley E. Wood; Robert A Weinhardt, both of Ridgecrest, Calif.

[73] Assignee: The United States of America as represented by the Secretary of the Navy, Washington, D.C.

[21] Appl. No.: 09/137,864

[22] Filed: Aug. 7, 1998

[51] Int. Cl.[7] .............................. B28B 1/54; B01J 13/02

[52] U.S. Cl. .............................. 425/6; 264/9; 264/4.4

[58] Field of Search .............................. 425/6, 86; 264/9, 264/4.4

[56] References Cited

U.S. PATENT DOCUMENTS

| | | | |
|---|---|---|---|
| 3,530,207 | 9/1970 | Scheer | 264/14 |
| 4,251,195 | 2/1981 | Suzuki et al. | 425/6 |
| 4,422,985 | 12/1983 | Morishita et al. | 264/4.4 |
| 5,400,642 | 3/1995 | Palacios et al. | 73/23.2 |
| 5,698,142 | 12/1997 | Prager et al. | 264/9 |
| 5,725,888 | 3/1998 | Scott et al. | 425/6 |

*Primary Examiner*—Harold Pyon
*Assistant Examiner*—Emmanuel Luk
*Attorney, Agent, or Firm*—David Kalmbaugh

[57] ABSTRACT

Prills of ammonium dinitramide (ADN) are prepared by melting this salt with a stabilizer and, by dry nitrogen pressure, injecting the molten salt into an inert, perfluorinated carrier liquid of greater specific gravity which, initially, is above the solidification temperature of the salt. The molten salt and carrier liquid pass together in turbulent flow through a heated conduit in which stationary vanes disperse the salt into droplets. The liquid and salt then pass in turbulent flow through a cooled conduit for solidification of the salt into prills without agglomeration. The prills are then separated from the liquid by flotation and any liquid carried with the prills recycled. The main flow of carrier liquid is pumped through a preheater and then back to the molten salt injector. The cooled conduit is provided with compression refrigeration, the refrigerant passing in parallel flow along the conduit and the compressed refrigerant passing to the preheater before condensation.

6 Claims, 1 Drawing Sheet

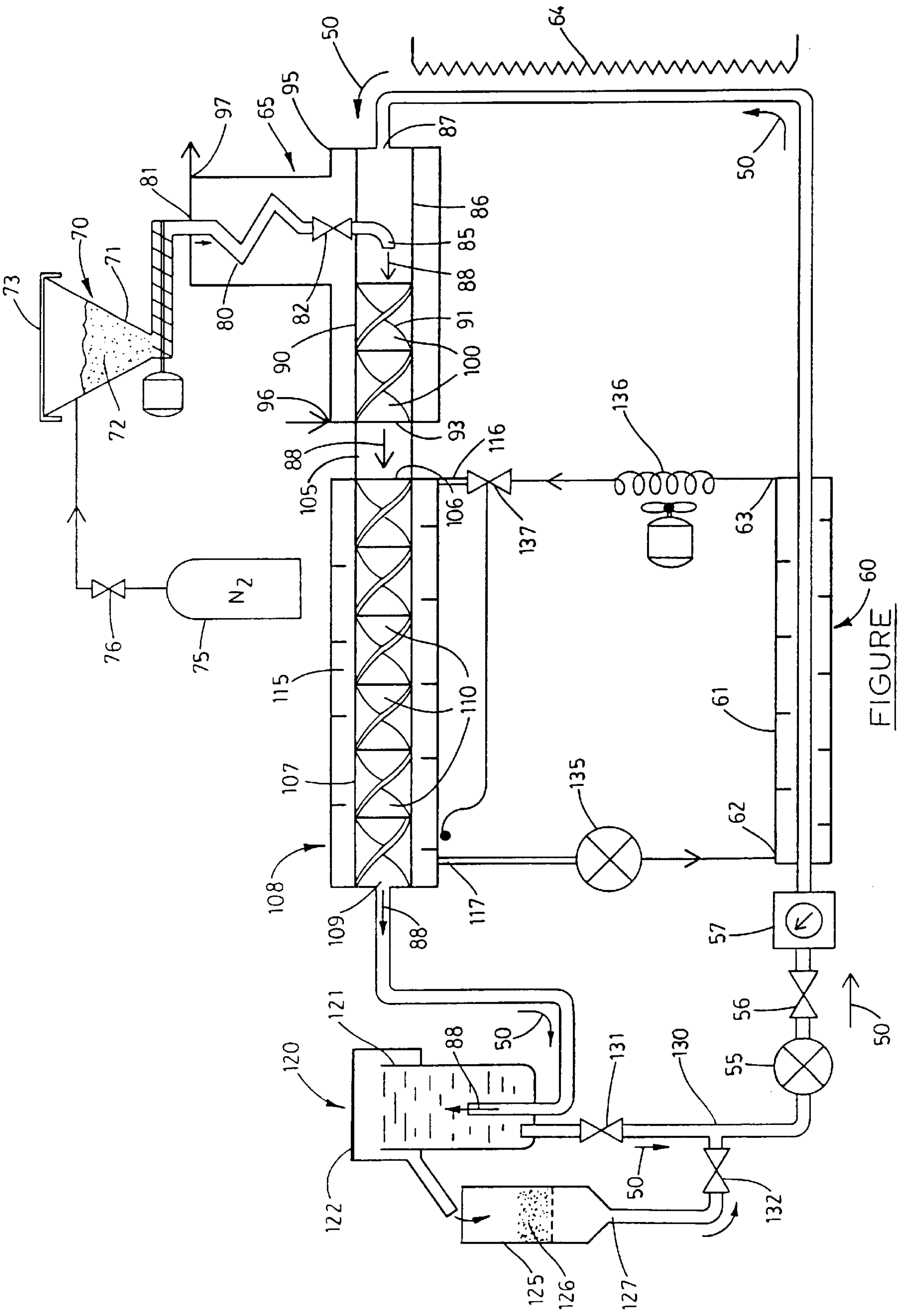
FIGURE

APPARATUS FOR PRILLING AN OXIDIZING SALT OF AMMONIA

BACKGROUND OF THE INVENTION

1. Field of the Invention

The present invention pertains to apparatus for direct preparation of solid nonmetallic particulates by liquid comminuting from molten material injected into another and moving liquid, the apparatus being particularly useful with oxidizing salts of ammonia.

2. Description of the Prior Art

Prills or small, solid spherical particles are used for a variety of purposes as for application of fertilizers and for inclusion of oxidizing materials in energetic compositions. In the prior art, prills are made by spraying molten material through a number of nozzles to form droplets and allowing the droplets to fall through a column of air or liquid until they cool sufficiently to solidify and can withstand impacting the bottom of the column.

This method has a number of deficiencies For one, the height of such cooling columns using air typically ranges from 20 or 30 feet to nearly 100 feet in height which is not a function of volume of production and thus cannot be scaled down for low volume or laboratory production. For another, control of prill size is by selecting the size of the nozzles which does not provide precise control of prill size, particularly in small sizes such as the about 50 microns desirable with oxidizing materials. Further, precise control of the cooling rate is not possible so that the product has irregular crystallization or fractures caused by either too slow or too rapid cooling. Also, impacts of droplets or incompletely hardened particles with other droplets, particles, or column sides results in a product with indentations and other irregularities. Similar problems occur in cooling droplets in a liquid which boils, otherwise changes phase, or releases gas on contact with the molten droplets.

Further, this method is dangerous with an energetic material since a relatively large quantity of the material is melted together, as in a vessel with a liquid level providing sufficient head for spraying, because the hazard of fire or violent reaction increases with temperature and volume of material. A fire or violent reaction may, of course, propagate from the heated material to cooler material awaiting melting or already prilled.

The dangers of prior art prilling methods and apparatus are particularly serious with the oxidizing salt of ammonia, ammonium dinitramide (ADN) which is extremely sensitive although having a nominal freezing and melting temperature of about 93° C. which is substantially below that of ammonium nitrate (AN) where this temperature is about 175° C. In a conventional prilling tower, where hot droplets or particles may contact causing ignition or violent reaction which may then propagate, the sensitivity of ADN, which detonates in small amounts, could be disastrous. Therefore, the use of ADN has been limited by its unavailability in small, regular particles of uniform size. While ammonium nitrate can be ground when cool, grinding of ADN even when cool is likely to result in fire or violent reaction.

Even in the absence of such reactions, ADN is also difficult to handle, for prilling or other purposes, because molten ADN is highly corrosive to all metals. Also, ADN can supercool as much as 70° C. between the molten and solid states, thus requiring the removal of large quantities of heat to insure solidification of prills. Even if it were safe to prill ADN in air columns, this supercooling property would require large and expensive columns.

Insofar as known to applicants, prilling of ADN in liquid filled columns has not heretofore been attempted since ADN is highly soluble in water and hot ADN presents a significant safely hazard with oxidizable materials such as mineral oils.

BRIEF SUMMARY OF THE INVENTION

Accordingly, an object of the present invention is to provide apparatus for the production of prills in any quantity and in a relatively small space.

Another object is to provide for the production of prills uncontaminated by exposure to air, water, or other chemically reactive materials.

A further object is to provide prills which are without surface irregularities or internal imperfections and which may have a selected size.

Yet another object is to provide for the production of prills by apparatus effective with materials which are corrosive when molten or which supercool on solidification.

A specific object is to safely provide prills of sensitive and energetic materials by minimizing the amount of heated or molten material present, by isolating such material from the bulk of the energetic material in the apparatus, by eliminating impacts with prills being formed, and by eliminating the propagation of reactions between prills being formed.

Another specific object is to safely provide prills of ammonium dinitramide which may have a size selected in a range of 20–350 microns.

A particular object is to provide apparatus meeting the above objects by the inclusion of a carrier fluid which is inert, supports and forms droplets of molten material being solidified into prills, and does not change phase on contact with the molten material.

Another particular object is to produce prills by the use of such a carrier fluid which does not solidify or boil at the temperatures of molten or solidified materials involved in prilling, and which has suitable densities and viscosities for prilling involving highly turbulent flow.

An ultimate object is to provide apparatus which provides the above and other advantages, which is economical in operation by the recycling of heat and such carrier fluid, and which is fully effective.

These and other objects and advantages are achieved by apparatus in which a material to be prilled is melted and the molten material introduced into a carrier liquid which supports and forms droplets of the molten material. Such apparatus is particularly adapted for prilling an oxidizing salt of ammonia, specifically ammonium dinitramide (ADN) melted with a stabilizer where the meltage is introduced by dry nitrogen pressure into an inert, perfluorinated carrier liquid which is of greater specific gravity than the molten salt and in which changes in density and viscosity with temperature are appropriate for prilling involving highly turbulent flow.

The carrier liquid is initially above the solidification temperature of the molten material to be prilled, and this material is injected into the moving carrier liquid. The combined flow passes in turbulent flow through a heated conduit, in which stationary vanes disperse the molten material into droplets, and then through a cooled conduit for solidification of the material into prills without agglomeration. The size of the prills may be selected precisely, as within a range of 20–350 microns, by controlling the rate of flow of the carrier liquid and thus the turbulence which disperses the droplets.

The prills may be separated from the carrier liquid by flotation with any such liquid carried with the prills being recycled. After separating the prills, the main flow of carrier liquid is pumped through a heater and then back to the molten material injector.

To avoid problems with supercooling, as with ADN, the cooled conduit is cooled by compression refrigeration with the combined flow in the cooled conduit being maintained in a turbulent condition. The evaporated refrigerant passes in parallel flow along the cooled conduit, and to provide heat regeneration, the compressed refrigerant is passed to a carrier liquid preheater before passing to a condenser.

BRIEF DESCRIPTION OF THE DRAWING

The above and other objects, advantages, and novel features of the present invention will be apparent from the following detailed description when considered with the accompanying drawings in which the FIGURE is a diagram of apparatus embodying the principles of the present invention for prilling an oxidizing salt of ammonia.

DETAILED DESCRIPTION OF THE INVENTION

Referring more particularly to the drawings, in the FIGURE is shown apparatus constructed in accordance with the present invention for continuous prilling by introduction of a molten liquid into a carrier liquid.

The apparatus is particularly effective for forming small, regular particles of uniform size from the oxidizing salt of ammonia, ammonium dinitramide (ADN) which is extremely sensitive and is highly corrosive to all metals when molten. The apparatus is adapted to form prills of stabilized ADN in a selected size in the range of about 50 to 350 um. The apparatus melts a mixture of powdered ADN and stabilizer and then forms the prills by injecting the molten mixture into a chemically inert, heat transfer, carrier liquid which is continuously recirculated within the apparatus without significant loss. This liquid is in turbulent flow when the mixture is injected so as to break up the molten mixture into small droplets and to separate them during subsequent cooling and solidification into prills. To prevent supercooling of the droplets without solidification during cooling of the droplets and prills, the liquid is maintained in turbulent flow while being cooled by compression refrigeration. To prevent chemical reaction or contamination of the ADN, the apparatus is constructed of chemically inert materials and protects its contents from exposure to the atmosphere or to moisture.

The carrier liquid isolates the ADN material, particularly heated and molten such material, from feed material and from exposure to air, moisture, or other chemically reactive or contaminating materials. Immersion of the ADN material in the inert fluid eliminates fire propagating between droplets or prills and eliminates impacts with prills being formed. The carrier liquid removes the heat of fusion from the droplets so that they solidify into the desired solid spherical prills. The carrier liquid has high thermal conductivity which, together with selection of the carrier liquid temperature during cooling, provides a cooling rate resulting in prills without irregular crystallization or thermally induced fractures caused by either too slow or too rapid a cooling rate. The carrier liquid provides a consistent, all liquid environment surrounding each droplet of molten material as it solidifies resulting in prills without indentations or irregularities. This requires a liquid with a sufficiently high boiling point that it will not change phase or produce gas bubbles on contact with the heated ADN product. Also, the carrier liquid must not become excessively viscous or solidify at the lowest temperature used within the apparatus. The carrier liquid supports and forms droplets of the molten material and, for flotation separation of the prills, requires a greater density than the solid material. It is essential that the carrier liquid have suitable densities and viscosities for prilling involving highly turbulent flow and that changes in density and viscosity with temperature not affect circulation of the liquid and prill formation and separation. Finally, it is desirable that the carrier liquid be non-toxic.

Liquids that are suitable for prilling by the subject apparatus and that generally meet the above criteria are sold under the tradename "Fluorinert" by the 3M Specialty (Chemical Division of St. Paul, Minn. These liquids are perfluorinated and are stated to have a viscosity equivalent to water and a thermal expansion eight times that of water.

For prilling ADN in accordance with the present invention, the particular such liquid identified as "FC-75" has been found effective. This particular liquid is believed to contain perfluorinated cyclic ethers and is catalogued as having a typical boiling point of about 102° C. and a pour point of −88° C. This pour point is sometimes referred to herein as "fluid temperature" and is, of course, above the melting temperature of the liquid. ADN has a nominal freezing and melting temperature of about 93° C. and can, as before mentioned, supercool as much as 70° C. between the molten and solid states to a temperature sometimes referred to herein as "supercooling temperature". It is evident that this perfluorinated liquid has a boiling temperature greater than the freezing temperature of ADN, and flows at a fluid temperature which is less than this freezing temperature and less than such a supercooling temperature.

The density of the FC-75 liquid is cataloged as about 1.77 $G/cm^3$ at 25° C., and the density of solid ADN at room temperature is about 1.81 $G/cm^3$. This relative density does not provide flotation separation as shown in the FIGURE, but separation by filtration or centrifugal action are also effective for purposes of the present invention. The density, viscosity, surface tension, and other properties of molten ADN have not been investigated because of the danger of working with this material. It is believed that, due to its relatively great thermal expansion, the FC-75 material is significantly less dense than ADN at temperatures of about 100° C. at which, as described below, a molten ADN mixture is injected into the carrier liquid.

The apparatus represented in the FIGURE has a fluid circuit in which, during prilling, a flow of the carrier liquid is continuously circulated as indicated by arrows 50 with the liquid being at various temperatures above its freezing point and below its boiling point.

The apparatus is depicted functionally as having the carrier liquid so circulated by a pump 55 which discharges through a flow control valve 56 and a flow meter 57 so as to selectively vary and measure the flow rate of the carrier liquid for a purpose subsequently explained. As also subsequently explained, the carrier liquid at the pump portion of the circuit is at its lowest temperature in the fluid circuit of about 40° C. and has been substantially separated from ADN; however, residual solid ADN may be present and the pump must be constructed so as not crush this residual ADN. For this purpose and to combine the functions of the flow motivating and controlling elements 55 through 57, a variable speed, positive displacement, progressing cavity pump having a rotor in an elastomeric sleeve has been found effective. Such pumps are sold by Moyno Industrial Products of Springfield, Ohio.

From the flow motivating and controlling elements 55 through 57 the carrier liquid passes to a regenerative heater 60 where the liquid is preliminarily heated by compressed refrigerant in a jacket 61. The refrigerant enters and exits this jacket at corresponding connections 62 and 63 thereto. The carrier liquid so preheated in heater 60 then passes to an electric resistive heater 64 where it is heated to a temperature of about 100° C. which is thus above the melting temperature of ADN and between the boiling and freezing temperatures of the carrier liquid.

The heated carrier liquid then passes to a melter and injection assembly which is indicated generally by numeral 65 and is constructed as subsequently described for melting ADN and introducing the melted ADN into the carrier fluid.

Assembly 65 is provided with ADN in solid, particulate form by a screw feeder 70 having a hopper 71 in which is placed feed material 72 consisting of pulverized, solid ADN and, typically, hexamine as a decomposition stabilizer. The hopper has a tightly closeable cover 73 and is connected to a source 75 of dry, pressurized nitrogen gas. The flow of this gas to the hopper and resulting pressure therein are controlled by a valve 76 to inject the molten ADN into the carrier fluid. The feeder provides physical isolation between heated materials and feed material 72 to reduce the possibility of any reaction propagating into the feed material and to minimizes the amount of heated material present at any one time.

Melter and injection assembly 65 has a generally vertical melter conduit 80 of heat conductive material. This conduit has an inlet 81 which receives a continuous feed of the particulate ADN and stabilizer from feeder 70 and is of sinuous configuration to increase heat transfer area while passing particulate material. The melter conduit has an outlet connected to a molten material flow control valve 82 through which molten ADN and stabilizer are discharged by nitrogen pressure from source 75 to a nozzle 85 disposed within a cylindrical, horizontal injection conduit 86 of heat conductive material. Conduit 86 has an inlet 87 for the flow of carrier liquid axially of this conduit from heater 64. The nozzle injects the ADN material from valve 82 centrally into and with the flow of carrier liquid so that the ADN material and carrier fluid continue in the above described fluid flow circuit as a combined flow identified by arrows 88.

Assembly 65 has a dispersing conduit 90 which is a continuation of injection conduit 86 and receives combined flow 88 therefrom for encounter with a dispersing device 91 which generates turbulence in the combined flow so as to disperse the molten ADN and stabilizer mixture into droplets in the combined flow. This combined flow with the droplets exits the dispersing conduit and assembly 65 at an outlet 93 thereof.

Assembly 65 has a heating jacket 95 surrounding conduits 80,86, and 90 and provided with an inlet 96 and an outlet 97 for a any suitable heated fluid at a temperature above the melting temperature of the substance to be prilled. The jacket thus serves, at the conduit 80, to melt this substance from the solid form in which it is delivered from feeder 70 and, at the conduits 86 and 90, to maintain this substance in the molten form.

With ADN and the FC-75 liquid, temperatures in jacket 95 in the range of 100 to 110° C. have been found effective. The temperature of the carrier liquid at it enters the injector assembly is, typically, 0 to 5° C. less than this jacket temperature. At nozzle 85 the temperatures of the carrier liquid and the molten ADN material are about the same. For use in the jacket, one of the above-identified “Fluorinert” liquids sold as “FC-40”, which boils at 155° C. and is less expensive than FC-75, has been found effective. However, FC-40, which is cataloged as having a kinematic viscosity of 2.2 cs at 25° C. while the corresponding value for FC-75 is 0.8 cs, was found too viscous at lower temperatures used in the apparatus of the FIGURE.

Dispersing device 91 functions with the carrier liquid, which has a density and viscosity selected for this purpose, to generate and promote turbulence of the combined flow 88 at this element so as to form and disperse the before mentioned droplets of molten ADN material in the carrier liquid. The droplet size, which determines the prill size, is a function of the density and viscosity of each component of the combined flow, the interfacial tension and volume fraction of these components, and apparatus parameters such as diameter of the conduit 90 and structure of the dispersing device, and fluid velocity in the conduit. The most important parameters for determining droplet size are expressed by the Weber Number which relates inertial forces to interfacial forces while the Reynolds Number, which relates inertial forces to viscous forces, is less important with turbulent flow where the inertial forces dominate. However and as mentioned above, the properties of molten ADN are not well-known, but the flow must be fully turbulent to produce ADN prills in the range of 50 to 350 um. With the structure, materials, and temperatures set forth herein for prilling ADN, an internal diameter of ⅜ inch for a conduit corresponding to conduit 90 and a flow of carrier liquid at a point corresponding to flow meter 57 of about 0.25 to about 1.00 gallons per minute was effective for the production of prills in such range.

With a particular construction of the dispersing conduit 90 and device 91 and a particular carrier liquid and molten material to be prilled, the size of the prills is selectable in accordance with the present invention by varying the flow rate of the carrier liquid at the inlet 87 of injection conduit 86 and thus varying the flow rate of the combined flow and the turbulence which disperses the droplets. It is evident that any suitable flow motivating and control elements, such as elements 55, 56, through 57 or the before mentioned variable speed, positive displacement pump, are effective for this purpose.

For the device 91 which causes the liquid ADN to breakup into droplets, it has been found effective to employ a succession of static mixer elements 100 of the kind disclosed and claimed in U.S. Pat. No. 3,286,992, which issued Nov. 22, 1966, and further described in U.S. Pat. No. 4,014,463. These elements are described as a plurality of helical sheet-like elements extending in series longitudinally within a tube with each element being twisted so that its leading edge is at a substantial angle to its trailing edge. The leading and trailing edges of adjacent elements are at a substantial angle and the elements are alternately right and left handed. To prevent attack by the molten ADN, elements 100 and other elements of the apparatus represented in the FIGURE may be coated with polytetrafluoroethylene material.

From dispersing conduit 90 of heated melter and injection assembly 65, combined flow 88 of carrier liquid and of droplets of molten ADN material passes through a relatively short transition conduit 105 to an inlet 106 of a cooling conduit 107 which is of heat transmissive material and is included in a cooler assembly 108. This assembly cools the combined flow to a temperature below the freezing temperature of the ADN material and above the melting temperature of the carrier liquid so that the droplets solidify into prills of the ADN material flowing in the carrier liquid as a continuation of the combined flow which leaves the assembly at an outlet 109.

Conduits 90, 105, and 107 are substantially continuous so that the turbulence generated in the combined flow by static mixer elements 100 continues in conduit 107 where this turbulence is maintained by a succession of further static mixer elements 110 substantially identical to the elements 100. As shown in the FIGURE there are several times as many of the elements 110 as of the elements 100. Cooling of the combined flow to form prills occurs during this maintained turbulence with the carrier fluid and this turbulence preventing agglomeration of the droplets or of the prills as the prills form from the droplets.

Assembly 108 has a parallel flow cooling jacket 115 about conduit 107. This jacket has an inlet 116 through which the jacket is provided with refrigerant which, after cooling conduit 107, passes to an outlet 117. As before mentioned, ADN requires the rapid removal of large quantities of heat to insure solidification of prills without supercooling. This rapid cooling is provided by a high heat transfer rate through conduit 107 due to the refrigerant, which is maintained at a temperature of about 50° C. below the temperature of the combined flow at cooler outlet 109, and due to the turbulence maintained in the combined flow by elements 110. This turbulence results in rapid heat transfer from the forming prills to the carrier liquid and from this liquid to the refrigerant, the carrier liquid being selected to have a density and a viscosity resulting in turbulent flow of said carrier fluid in cooler assembly 108 at the lowest temperature of said combined flow therein. As a result, prills form from the ADN material droplets provided to the cooler assembly despite any supercooling which occurs during the turbulent flow in conduit 107 where the ADN material is rapidly cooled to a temperature where the droplets of this material solidify despite any tendency to supercool. For prilling of the hexamine stabilized ADN material using the above-identified FC-75 perfluorinated carrier liquid, a temperature of the combined flow at cooler assembly outlet of about 45° C. has been found effective.

From cooler outlet 109 the combined flow of prills and carrier liquid is directed to any suitable device for separating the prills from the liquid and for providing the main flow of the separated liquid for recycling to pump 55 and then to heater 60. A flotation separator 120 of well-known construction is shown in the FIGURE for this purpose and is preferred as being appropriate for continuous production of prills. However, with the FC-75 liquid, which is slightly more dense than ADN at temperatures of about 25° C., the prills may be separated by mechanical filtration.

The combined flow enters separator 120 centrally within a cylindrical internal partition 121 of the separator. Prills in the combined flow float over this partition and pass, together with a portion of the carrier liquid from this flow, into a chamber 122 enclosing the top of the partition. The prills and this liquid portion pass gravitationally from the chamber into a filter assembly 125 which retains the prills as indicated by numeral 126 while the liquid passes to an outlet 127. After the prills are removed from the filter assembly, any carrier liquid remaining on the prills may be removed by vacuum distillation.

A conduit 130 conducts the main flow of the carrier fluid from the bottom of separator to pump 55. A valve 131 in this conduit adjusts the flow therein for suitable overflow at partition 121. Conduit 130 also receives carrier liquid from filter assembly outlet 127 by way of a valve 132. Conduit 130 thus serves to recycle to pump 55 the carrier liquid from which prills 126 were separated. It is evident that the liquid so recycled is reheated in heaters 60 and 64 to a temperature above the freezing temperature of the ADN material for introduction of a continued flow of the molten ADN material into the carrier fluid at nozzle 85.

The apparatus shown in the FIGURE includes elements which may be considered as functioning, together with cooler assembly 108 and regenerative heater 60, as a refrigeration system, a regenerative heat transfer system, or a heat pump for minimizing the heating and cooling energy consumption to provide the required temperature variations in the circulating carrier liquid. These elements transfer heat removed from the carrier liquid by turbulent heat transfer in the cooler assembly to the regenerative heater for heating the flow of carrier liquid threat. For this purpose, cooler jacket 115 functions as the evaporator of a refrigeration system and jacket 61 of the heater functions as a condenser of the refrigerant system.

These elements may be of conventional construction and include a refrigeration compressor 135 connected for compressing refrigerant from cooler jacket outlet 117 and for delivering the refrigerant to regenerative heater jacket inlet location 62. These elements also include a refrigeration condenser 136 which is represented as air cooled. This condenser receives refrigerant from regenerative heater jacket outlet location 63, completes condensation of the refrigerant, and delivers the refrigerant through an expansion valve assembly 137 to cooler jacket inlet 116.

The operation of the described apparatus is believed clearly apparent and is briefly summarized at this point. After filling and closing the feeder hopper 71 subsequent operations may be performed by remote control. Power is applied to pump 55 and compressor 135 and heat is applied at heater 64 and jacket 95 until the apparatus reaches operating temperature. To maintain the proper flow of molten ADN material, the hopper is pressurized and the speed of feeder 70 and the position of valve 82 are adjusted. The flow of carrier liquid from pump 55 is selected so that mixer elements 100 provide the proper turbulence a or generation of the desired sized of prills, and valve 131 is adjusted to provide sufficient overflow in separator 120 for the produced prills 126 of stabilized ammonum ditramide.

Although a preferred apparatus for prilling ammonium dinitramide has been shown and described, it is to be understood that the invention may be practiced within the scope of the following claims other than as specifically set forth herein.

What is claimed is:

1. Apparatus for forming prills, the apparatus being for use with:

a continuous feed of a substance which
- is be prilled,
- is in particulate form, and
- has a nominal freezing temperature but may remain liquid to a supercooling temperature below said nominal freezing temperature;

a continuous flow of a carrier in liquid form, the carrier
- being inert to said substance,
- being fluid at a temperature below said supercooling temperature,
- being provided to the apparatus at a temperature above said freezing temperature, and carrying the prills with said flow from the apparatus; and a separator receiving said flow of the carrier fluid with the prills, the apparatus comprising:
- a first conduit having
  - an inlet receiving said continuous feed of the substance to be prilled in particulate form, and
  - an outlet discharging the substance to be prilled in molten form;

a second conduit having
an inlet receiving said flow of said carrier into the second conduit,
a nozzle connected to said outlet of the first conduit and receiving said substance to be prilled in molten form, said nozzle having an orifice injecting said substance in molten form into said flow of said carrier in said second conduit, and
an outlet discharging said substance in molten form ejected from said nozzle and said flow of said carrier as a combined flow;
a third conduit having
an inlet for said combined flow,
an element for generating turbulence in said combined flow so as to disperse said substance in molten form into droplets in said combined flow, and
an outlet for said combined flow with said droplets;
a heating jacket surrounding said first conduit, said second conduit and said third conduit for providing heat at a temperature above said freezing temperature to said first conduit, said second conduit, and said third conduit so as to melt said substance from said particulate form into said molten form in said first conduit and to maintain said substance in said molten form in said second conduit and in said third conduit;
a fourth conduit having
an inlet for said combined flow with said droplets from said third conduit, an outlet for said combined flow with said combined flow to said separator, and
an element for maintaining turbulence in said combined flow so that said droplets and said prills of said substance to be prilled remain dispersed in said combined flow and so that turbulent heat transfer occurs from said combined flow; and
a cooler assembly surrounding said fourth conduit for removing heat from said combined flow by said turbulent heat transfer in said fourth conduit to cool said combined flow to a temperature below said supercooling temperature so that said droplets solidify to said prills in said fourth conduit substantially without agglomeration of said droplets and without agglomeration of said prills.

2. The apparatus of claim 1 wherein said inlet of said first conduit is pressurized to motivate said substance to be prilled through said first conduit and said nozzle, and wherein said apparatus further comprises a valve disposed between said first conduit and said second conduit for controlling said discharge of said substance in molten form from said first conduit.

3. The apparatus of claim 1 further comprising a plurality of flow motivating and controlling elements including a pump having a discharge, a flow control valve having an inlet connected to the discharge of said pump and an outlet, and a flow meter having an inlet connected to the outlet of said flow control valve and an outlet connected to said inlet of said second conduit, said plurality of flow motivating and controlling elements controlling said flow of said carrier in liquid form received at said inlet of said second conduit so as to determine, in said combined flow in said third conduit, said turbulence and the dispersion of said substance in molten form into said droplets, whereby the size of said droplets is controlled to select the size of said prills.

4. The apparatus of claim 3 wherein said apparatus includes said carrier, and said carrier is selected to have a density and a viscosity promoting said turbulence of said combined flow in said third conduit.

5. The apparatus of claim 4 wherein the apparatus is for use in forming said prills of ammonium dinitramide and said carrier is a perfluorinated organic compound.

6. The apparatus of claim 1 further comprising a refrigeration compressor connected to said cooler assembly and a regenerative heater connected to said refrigeration compressor, said regenerative heater being connected to said inlet of said second conduit for providing heat removed from said combined flow by said turbulent heat transfer in said fourth conduit to said flow of said carrier received at said inlet of said second conduit.

* * * * *